(12) United States Patent
Gary

(10) Patent No.: US 7,076,551 B2
(45) Date of Patent: Jul. 11, 2006

(54) USING REMOTE PROCEDURE CALLS TO MANAGE CO-PROCESSOR RESOURCES

(75) Inventor: Scott Paul Gary, Santa Barbara, CA (US)

(73) Assignee: Texas Instruments Incorporated, Dallas, TX (US)

( * ) Notice: Subject to any disclaimer, the term of this patent is extended or adjusted under 35 U.S.C. 154(b) by 485 days.

(21) Appl. No.: 09/822,748

(22) Filed: Mar. 30, 2001

(65) Prior Publication Data

US 2001/0049753 A1 Dec. 6, 2001

Related U.S. Application Data

(60) Provisional application No. 60/194,258, filed on Apr. 3, 2000.

(51) Int. Cl.
*G06F 15/173* (2006.01)

(52) U.S. Cl. ...................... 709/226; 709/223; 718/104

(58) Field of Classification Search ................ 709/721, 709/330, 203, 223–226; 719/330; 717/172–173; 712/34–35; 718/104
See application file for complete search history.

(56) References Cited

U.S. PATENT DOCUMENTS

| | | | |
|---|---|---|---|
| 5,446,901 A * | 8/1995 | Owicki et al. .............. 711/154 |
| 5,452,420 A * | 9/1995 | Engdahl et al. ............. 710/105 |
| 5,621,894 A * | 4/1997 | Menezes et al. ........... 709/227 |
| 5,671,414 A * | 9/1997 | Nicolet ....................... 719/328 |
| 5,724,418 A * | 3/1998 | Brady ................... 379/265.02 |
| 5,728,960 A * | 3/1998 | Sitrick ....................... 84/477 R |
| 5,786,819 A * | 7/1998 | Weiser et al. ............... 345/840 |
| 5,787,281 A * | 7/1998 | Schreiber et al. .......... 719/328 |
| 5,890,189 A * | 3/1999 | Nozue et al. ............... 711/100 |
| 5,904,733 A * | 5/1999 | Jayakumar ..................... 713/2 |
| 6,141,697 A | 10/2000 | Hale et al. |
| 2002/0007389 A1* | 1/2002 | Jones et al. ................. 709/104 |

FOREIGN PATENT DOCUMENTS

| | | |
|---|---|---|
| WO | WO 94/14116 | 6/1994 |
| WO | WO 99/26222 | 5/1999 |
| WO | WO 99/44131 | 9/1999 |

OTHER PUBLICATIONS

"Remote Procedure Calls for an Attached Processor" IBM Technical Disclosure Bulletin, Jun. 1992 NB9206237.*
IBM Technical DisclosureBulletin, "Remote Procedure Call Extensions for Multiprocessors" vol. 37, Issue 12, pp. 39-40, Dec. 1, 1994.*
"*Remote Procedure Calls for an Attached Processor*", IBM Technical Disclosure Bulletin, vol. 35, No. 1B, Jun. 1992, pp. 237-238.

* cited by examiner

*Primary Examiner*—Majid Banankhah
(74) *Attorney, Agent, or Firm*—Frederick J. Telecky, Jr.; W. James Brady, III

(57) ABSTRACT

A first data processor (GPP) can manage resources of a second data processor (DSP) by making a remote procedure call (RPC) to the second data processor to invoke on the second data processor a program that supports management of data processing resources of the second data processor. The second data processor executes the program in response to the remote procedure call.

45 Claims, 7 Drawing Sheets

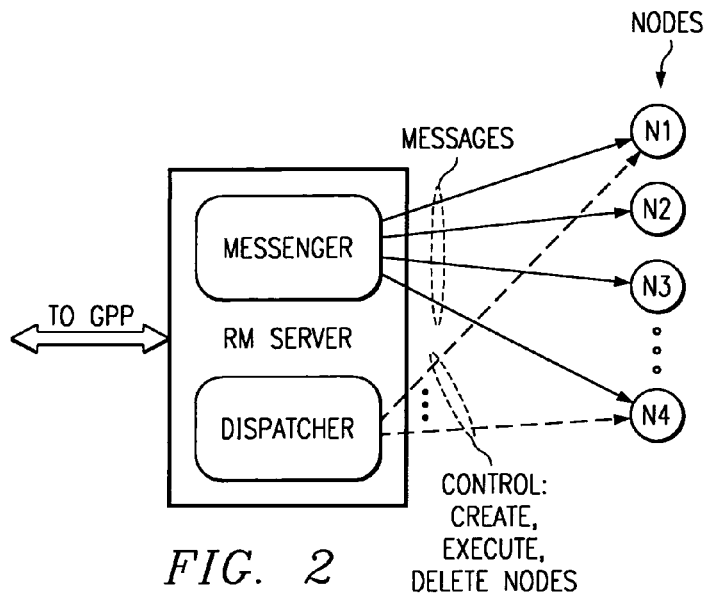

FIG. 2

| SERVER FUNCTION | PURPOSE |
|---|---|
| RMS_queryServer | ALLOW GPP TO QUERY SERVER INFORMATION |
| RMS_configureServer | ALLOW GPP TO SET SERVER CONFIGURATION PARAMETERS |
| RMS_createNode | CREATE A MESSAGE, TASK, OR xDAIS SOCKET NODE |
| RMS_executeNode | LAUNCH A NODE INTO ITS EXECUTE PHASE |
| RMS_deleteNode | DELETE A NODE'S RESOURCES |
| RMS_changeNodePriority | CHANGE EXECUTION PRIORITY OF A NODE |
| RMS_readMemory | READ A WORD OF DSP MEMORY |
| RMS_writeMemory | WRITE A BLOCK OF DSP MEMORY |

FIG. 3

| COMMAND FIELD (32-BITS) | CONTENTS |
|---|---|
| fxn | ADDRESS OF SERVER FUNCTION TO EXECUTE |
| arg1 | SERVER FUNCTION ARGUMENT 1 |
| arg2 | SERVER FUNCTION ARGUMENT 2 |
| data[] | FUNCTION-SPECIFIC DATA ARRAY |

FIG. 11

| REPLY FIELD (32-BITS) | CONTENTS |
|---|---|
| RESULT | NODE OR SERVER FUNCTION RETURN CODE |
| arg1 | COMMAND-SPECIFIC RETURN ARGUMENT 1 |
| arg2 | COMMAND-SPECIFIC RETURN ARGUMENT 2 |

FIG. 12

| SERVER FUNCTION | RESULT | arg1 | arg2 |
|---|---|---|---|
| RMS_queryServer | QUERIED VALUE | – | – |
| RMS_configureServer | SUCCESS/FAIL RETURN CODE | – | – |
| RMS_createNode | nodeCreate RETURN CODE | NODE ENVIRONMENT PTR | – |
| RMS_executeNode | nodeExecute RETURN CODE, OR COMMAND ACK | – | – |
| RMS_deleteNode | nodeDelete RETURN CODE | – | – |
| RMS_changeNodePriority | SUCCESS/FAIL RETURN CODE | – | – |
| RMS_readMemory | MEMORY CONTENTS | – | – |
| RMS_writeMemory | SUCCESS/FAIL RETURN CODE | – | – |

| RETURN CODE | ENUMERATED VALUE | MEANING |
| --- | --- | --- |
| RMS_EOK | 0 | OK, NO ERROR |
| RMS_EOUTOFMEMORY | 1 | MEMORY ALLOCATION FAILURE |
| RMS_EMEMFREE | 2 | MEMORY DE-ALLOCATION FAILURE |
| RMS_EOUTOFIO | 3 | I/O ALLOCATION FAILURE |
| RMS_EIOFREE | 4 | I/O DE-ALLOCATION FAILURE |
| RMS_ERESOURCE | 5 | A RESOURCE WAS UNAVAILABLE |
| RMS_ENOTFOUND | 6 | SYMBOL OR MODULE NOT FOUND |

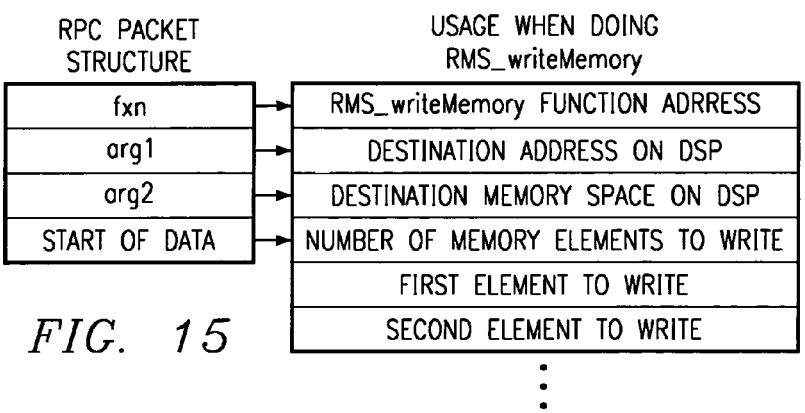

FIG. 15

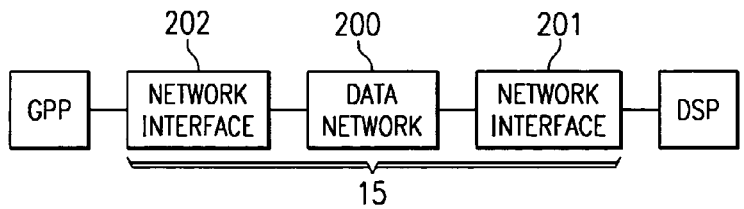

- PROVIDE DOWNLOAD FUNCTION IN DSP MEMORY — 210
- USE RPC TO INVOKE DOWNLOAD FUNCTION — 211
- USE RPC TO INVOKE NEW/REPLACEMENT FUNCTION — 212

USING REMOTE PROCEDURE CALLS TO MANAGE CO-PROCESSOR RESOURCES

This application claims the priority under 35 U.S.C. 119(e)(1) of copending U.S. provisional application No. 60/194,258 filed on Apr. 3, 2000, incorporated herein by reference.

FIELD OF THE INVENTION

The invention relates generally to data processing and, more particularly, to management of co-processor resources.

BACKGROUND OF THE INVENTION

Data processing systems (including single-chip systems) which utilize one or more host processors (for example microprocessors) and one or more co-processors (for example further microprocessors or digital signal processors) under control of the host processor(s) are well known in the art. In such systems, the co-processor is typically configured to perform desired functions by storing associated program information in a ROM (or other program memory) associated with the co-processor. The operational capability of the co-processor thus corresponds to, and is limited by, the functionality defined by the program(s) stored in its associated ROM.

It is therefore useful to have the capability of changing the program(s) in the ROM (or other program memory) associated with the co-processor. In many conventional systems, new programs can be provided by simply installing a new ROM, or electronically programming the existing ROM in place on a system board, whether the ROM is separate from the co-processor or integrated within the co-processor. However, replacing the programs available to the co-processor is difficult when, for example, the co-processor and its associated program memory are embedded in an integrated circuit together with the host processor, or when the co-processor and its program memory are located remotely from the host processor and hence remotely from the user of the system.

It is therefore desirable to provide a capability of changing the program(s) available to the co-processor without the requirement of physically accessing the co-processor.

According to the invention, a host processor can download a program to a co-processor by invoking a remote procedure call (RPC) mechanism. The RPC mechanism advantageously effectuates the program downloading without requiring the user to physically access program memory associated with the co-processor. The RPC mechanism is also advantageously used to retrieve (from the co-processor) information about the co-processor, to inspect memory associated with the co-processor, and to set configuration parameters of the co-processor.

BRIEF DESCRIPTION OF THE DRAWINGS

FIG. 2 diagrammatically illustrates exemplary embodiments of the RM Server of FIG. 1.

FIG. 3 illustrates in tabular format exemplary server functions which are supported by the RM Server of FIGS. 1 and 2.

FIG. 11 illustrates in tabular format an example of an RPC command packet format according to the invention.

FIG. 12 illustrates in tabular format an example of a packet format utilized by the Dispatcher of FIG. 2 to reply to the Resource Manager of FIG. 1.

FIG. 13 summarizes the use of the reply fields of FIG. 12 for each of the server functions of FIG. 3.

FIG. 14 illustrates in tabular format examples of the return codes of FIGS. 12 and 13.

FIG. 15 illustrates an example of an RPC command packet format for the RMS_writeMemory function of FIG. 3.

FIG. 16 diagrammatically illustrates a further exemplary embodiment of the system of FIG. 1 wherein the GPP and DSP are located remotely from one another.

FIG. 17 illustrates exemplary operations which can be performed by the embodiments of FIGS. 1 and 16.

DETAILED DESCRIPTION

Figure 1:
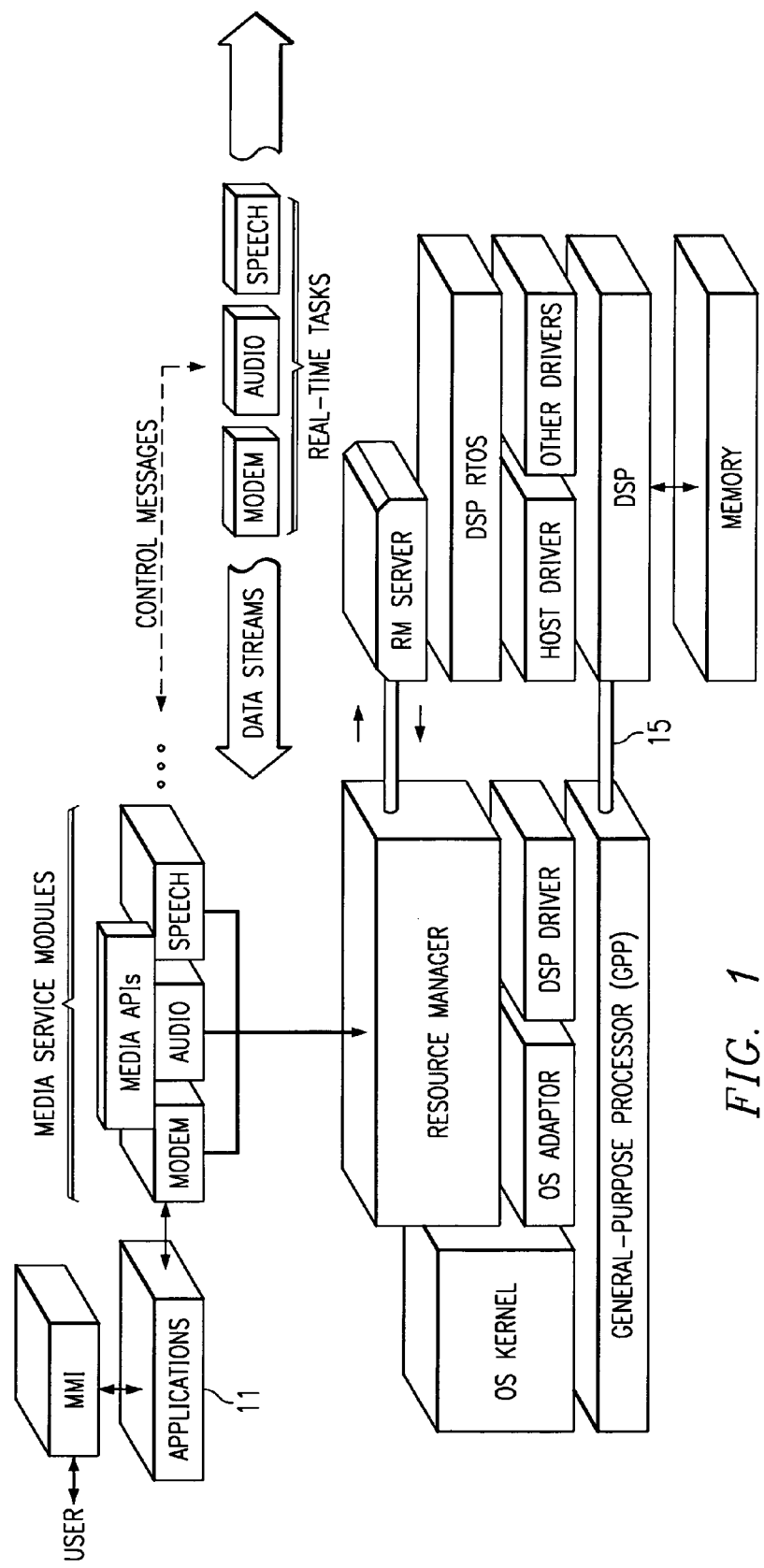
FIG. 1 diagrammatically illustrates pertinent portions of exemplary embodiments of a data processing system according to the invention.

Exemplary embodiments of a data processing system according to the invention are shown diagrammatically in FIG. 1.

In this system there is a General Purpose Processor GPP (e.g. a microprocessor) serving as a host processor. The GPP is connected to one or more DSPs acting as co-processors. End-user applications 11 or drivers on the GPP make calls into media service modules. These media service modules use a Resource Manager (RM) to manage DSP resources. The Resource Manager is responsible for: dynamically instantiating DSP resources to meet allocation requests; monitoring DSP resources; dynamically loading DSP code as needed; and implementing policies for managing DSP resources when there are conflicting requests. In various embodiments, the Resource Manager can also be responsible for tasks such as selecting a particular DSP device, statically loading a base code image to the DSP, starting and stopping the DSP, and implementing data streaming. The Resource Manager sits on top of a GPP OS (operating system) adaptation layer, and a DSP (link) driver for communicating with the DSP. A man-machine interface (MMI), for example a keyboard/keypad, a visual display, etc., permits communication between the applications 11 and a user. Examples of the FIG. 1 system include cellular telephones, laptop computers, engineering workstations and set-top boxes.

The following terms are used herein:

Node—an abstraction for a block of related code and data. In one embodiment, four types of signal processing nodes are defined: Message Nodes, Task Nodes, xDAIS Socket Nodes, and Device Nodes.

Message Node—This is a basic, minimal processing element, with a basic messaging capability with other nodes, and back to the GPP. A Message node need not be a task in the DSP's RTOS, (e.g., it might execute as a software interrupt), and it does not need to support device independent streaming IO (STRM).

Task Node—This enhanced message node exists as an independent execution thread in the DSP's RTOS (in some RTOSs this thread is a "task", in other RTOSs this may be a "process"). Task nodes support device independent streaming I/O with other nodes, and with the GPP.

xDAIS Socket Node—An xDAIS socket node is an enhanced task node that provides a framework, or housing for an xDAIS-compliant algorithm. The socket node facilitates data transfer from the algorithm to other nodes, or to the GPP.

Device Node—A device node manages either a physical DSP peripheral device, or implements a software device, (e.g., a communication path between two task nodes). Device nodes that manage a peripheral device encapsulate low-level hardware and communication details.

Task—an independent execution thread or process, that conceptually runs in parallel with other tasks within the same application.

Device Driver—a software module that encapsulates low-level hardware or communication details, and translates device-independent I/0 requests into device-dependent actions.

Stream—a device-independent mechanism used to exchange buffers of data using device-dependent drivers.

Three Phase Execution Model—a programming model where a node's code is broken into three separate phases corresponding to the key periods of its life cycle:

Create—allocate all resources needed by the node;
Execute—perform real-time signal processing;
Delete—free all resources created for the node.

On the DSP there is a real-time operating system (RTOS) at the foundation, and a Host (link) Driver that is used to communicate with the GPP. On top of the DSP RTOS sits an RM Server. The primary duty of the RM Server is to dynamically create, execute, and destroy signal processing nodes on the DSP, under Resource Manager control. In the diagram "modem", "audio", and "speech" are signal processing nodes that have been launched on the DSP by the RM Server. Other exemplary RM Server duties include altering node priorities, responding to Resource Manager configuration commands and status queries, and routing messages between the GPP and individual nodes. The RM Server uses a dedicated stream to receive commands from the Resource Manager, and a dedicated stream to send responses back to the Resource Manager.

Nodes can exchange data buffers with one another, and with the GPP, via device-independent stream I/O. Nodes also exchange control, status, and application-specific messages with the GPP, via the RM Server.

Examples of DSP targets for the RM Server include: TMS320 C54x and TMS320 C55x from Texas Instruments. Examples of RTOS targets for the RM Server are: TI's DSP/BIOS-II, and Enea's OSE.

The RM Server is partitioned into two separate components, corresponding to the two primary functions of the server: a Dispatcher and a Messenger. The Dispatcher is responsible for setup, launch, and tear-down of individual nodes, as well as providing a general remote-procedure call (RPC) mechanism that the Resource Manager on the GPP can use to run DSP code. The Messenger is responsible for routing control, status, and application-specific messages between nodes and the GPP. Typically the Dispatcher will run at a low priority in the DSP RTOS, while the Messenger will run at a high priority, so that it can pass high priority messages to high priority nodes. FIG. 2 is a conceptual block diagram of exemplary embodiments of the RM Server.

The basis of the RM Server Dispatcher design is a remote-procedure call mechanism. Each command from the Resource Manager to the Dispatcher will include a DSP function address of a server function to be executed, along with arguments. The (RPC-invoked) server functions are defined with specific signatures and duties that are the same for all DSP RTOSs. In some embodiments, server functions (internally) make native RTOS calls, and will therefore not be directly portable to another RTOS.

For example, assume that the Resource Manager wants to create a new task node. It sends a command to the RM Server Dispatcher that includes the address of an RMS_createNode server function, along with a structure that includes specific details about the task node to be created. Exemplary RMS_createNode function duties are: create a task node environment structure, create a message queue for the task node to receive commands from the GPP, create a semaphore for message notification, create the task node thread in an "inactive" state, call the task's specific create function, and respond to the GPP with the returned status code. The RMS_createNode function that is invoked on the DSP implements these duties as appropriate for the RTOS being used.

The RPC mechanism with RTOS-specific server functions provides efficiency and flexibility:

It minimizes use of DSP-side resources; the RM server just executes functions as it is told to by the Resource Manager.

It eliminates the need for a translation layer running on the DSP that takes a generic request and translates it into a sequence of RTOS-specific API calls. The RM server functions are small and efficient, and make native RTOS calls.

The Dispatcher RPC mechanism exists as a task of the DSP RTOS (e.g. task RMS_rpc as described hereinbelow). It blocks its own execution until a new command has arrived from the Resource Manager. On wakeup it will read the command and call the specific server function. It will then block waiting for a new command.

The Dispatcher RPC mechanism described above is prior art with respect to the present invention.

FIG. 3 illustrates RPC functions according to exemplary embodiments of the invention. These functions represent advantageous improvements over the prior art. According to the invention, individual server functions can be dynamically loaded to the target (co-processor) when needed, and the memory can be reclaimed when the functions are no longer needed. The present invention provides for extensibility; such as shown in server functions in FIG. 3, and other server functions (e.g., RMS_availableMemory, or RMS_CPULoad, etc.), can be added without affecting the existing RM Server functionality. These exemplary server functions are described in more detail later hereinbelow.

Figure 4:
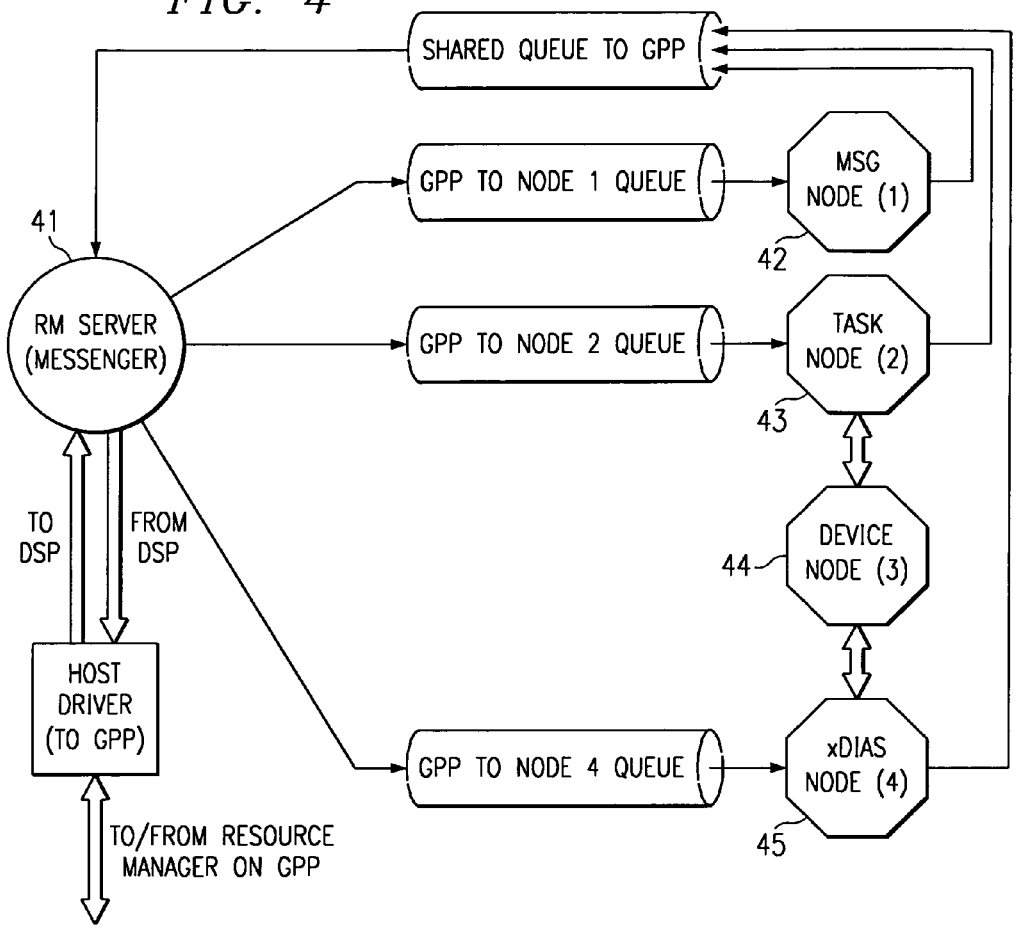
FIGS. 4–10 illustrate exemplary embodiments of the Messenger of FIG. 2 in greater detail.

As shown in FIG. 4, the RM Server Messenger 41 is used to route control, status, and application-specific messages between the GPP and individual nodes. It serves as a router distributing messages to individual nodes, and passing queued messages from nodes back to the GPP.

In FIG. 4 there is one Message node 42, one Task node 43, one Device node 44, and one XDAIS Socket Node 45. Some nodes have a dedicated message queue from the Messenger, and use a shared queue to send messages back to the GPP. Note that Device nodes have no connection to the Messenger. Nodes may also have application-specific STRM streams (not shown in FIG. 4) to the GPP through the host driver, but those streams are independent of the messaging paths.

In some embodiments, the messenger 41 is implemented as two software interrupts (SWIs). Some reasons for implementing the Messenger as SWIs are:

SWIs inherently run at high priority, allowing the Messenger to route high priority messages to high priority tasks.

SWIs are more efficient than using tasks. Using a task for the Messenger would mean a full task context switch when a task node posts a message to the GPP, and wakes up the (high-priority) Messenger task. Likewise, there would be a task context switch when the Messenger is done, back to the task that posted the message.

SWI efficiency is similar to that of a software-triggered interrupt service routine (ISR), since the ISR would need to save/restore C registers to call the Messenger. Some SWIs have a built-in mailbox feature that allows conditional posting of the SWI, and SWIs are also much easier to configure across platforms than a normal ISR (because on different platforms different CPU interrupts will be used, and there may be a problem finding an available interrupt on some platforms).

Using software interrupts for the Messenger is more efficient, but it is not as straight-forward an implementation as using a task. It requires modifications to the Host Driver to transport the messages differently than the other (normal) STRM streams it deals with.

Using SWIs requires special attention to pre-emption of a user's time-critical tasks. Simply implementing the Messenger as an SWI would cause messaging to always be higher priority than user tasks, (i.e., whenever a message got posted by a task, the Messenger would activate). For some applications this may be acceptable (and desirable too), but for others using a lot of messaging between the GPP and DSP, and time-critical tasks, this could be a problem. To deal with this, the invention takes advantage of a feature of software interrupts that allows for multiple conditions to be met before an SWI is actually run. For example, an SWI management function can be called to clear specific bits in the SWI's mailbox. When all bits in the mailbox are cleared, the SWI is ready to run, and is placed on its corresponding priority queue. When it runs, it will run to completion, at a higher priority than tasks (similar to a hardware ISR).

This feature of SWIs provides a mechanism to control when message transport actually occurs. For example, a simple configuration option could allow an application developer to choose between:

allowing messaging to happen whenever a message is ready—by specifying a default mailbox value with a single bit that gets cleared when a node calls its send function, or when a message arrives from the GPP, or allowing another entity on the DSP (e.g., a control task at a low priority) to control when the messages get routed by the Messenger—by specifying a default mailbox value that has two bits: the first bit is used as described above, and the second bit is posted by the control task when it wants to allow messages to flow.

Figure 5:
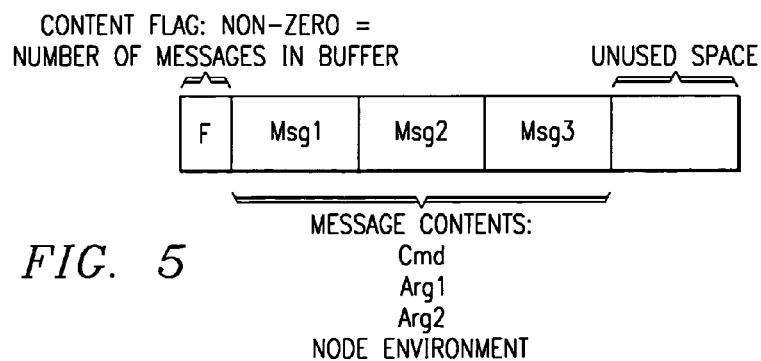

Messages sent to nodes on the DSP are sent on the "ToDSP" path from the Resource Manager to the Messenger. Multiple messages to different nodes can be "batched" together in a single data buffer from the GPP, as shown in FIG. 5. The first word of the buffer is used to indicate the contents of the buffer: a non-zero value indicates that the remaining data in the buffer is a set of messages destined for nodes. In FIG. 5, F would be 3, indicating 3 messages are held in the buffer.

Each message includes three words: Cmd, Arg1, Arg2 (described more below); plus a pointer to the environment structure of the node that is to receive the message. Note that nodes which can receive messages contain in their environment an object that holds a handle to both the node's message queue and semaphore.

The same format shown in FIG. 5 is used to send messages from nodes back to the GPP. The 'F' flag will tell the GPP how many messages are contained in the buffer, and in each message the 'Node Environment' pointer will allow the Resource Manager to determine which node sent the message to it.

Figure 6:
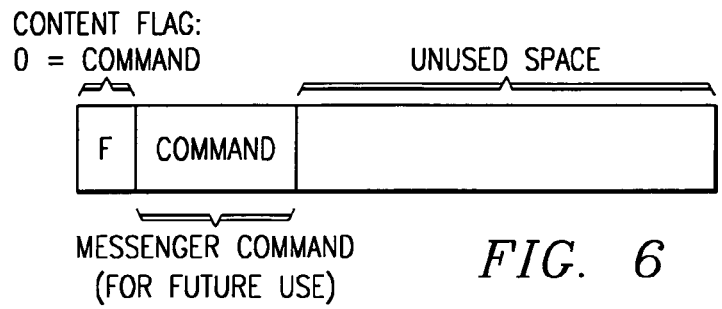

It may sometimes be desirable to send configuration or other commands directly from the Resource Manager to the Messenger itself. To do this, the first word of the buffer can be set to zero, indicating that the remainder of the buffer contains a command from the Resource Manager directly to the Messenger (i.e., the buffer has no messages for nodes, but a message for the Messenger itself). This is shown in FIG. 6.

Figure 7:
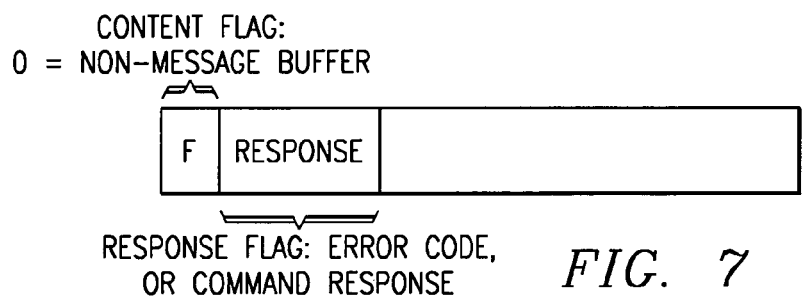

If the Messenger encounters an error while trying to send messages (e.g., there are no more DSP message frames available), or to allow the Messenger to respond to a (future) RM command, the first word of the response buffer can be set to zero, indicating that the buffer from the DSP does not contain messages from nodes, but an error or status response as shown in FIG. 7.

Figure 8:
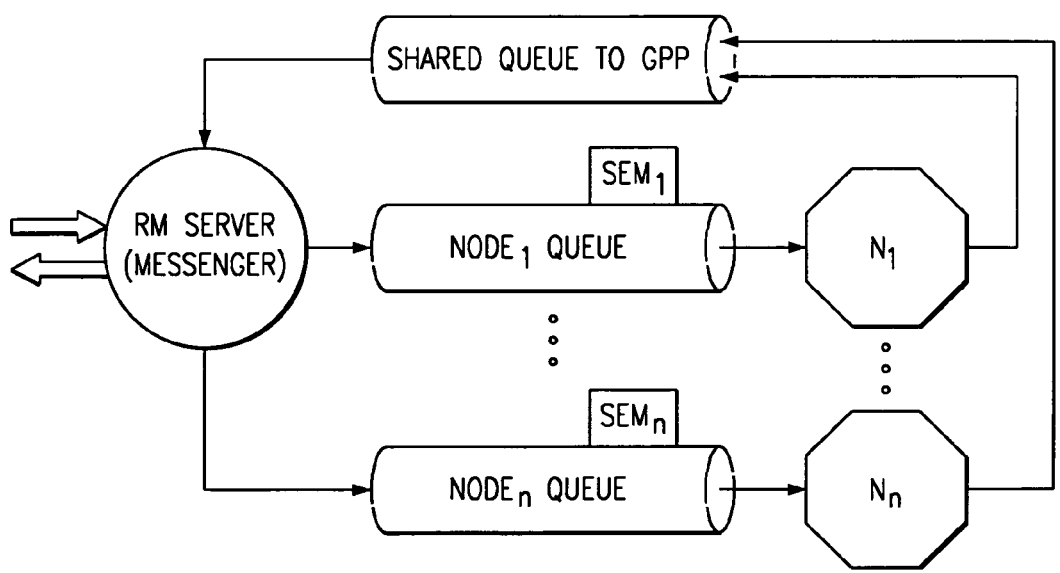

FIG. 8 shows more details of the communication between the Messenger and individual nodes in some exemplary embodiments. Each of the dedicated node queues has a companion semaphore handle that allows DSP node functions to register a semaphore to be posted when a new message is deposited in the node's queue. The shared queue to the GPP does not have a companion semaphore handle. When a function is invoked by a node to send a message to the GPP, that function will copy the message into the shared queue to the GPP, and then post the Messenger's SWI.

Figure 9:
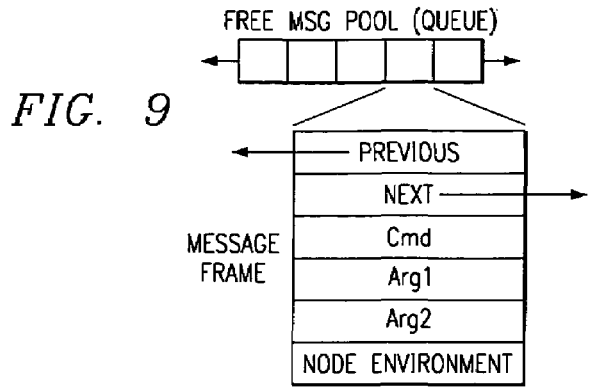

A pool of message frames is maintained by the Messenger to send messages to individual nodes. In the example of FIG. 9, message frames are fixed length, with 6 elements: Previous Link, Next Link, Cmd, Arg1, Arg2, and Node Environment. Simple messages to/from the GPP can be contained entirely within the three elements of the message: the Cmd field is used to designate the type of message, and determines the meaning of Arg1 and Arg2. For example, an exit message that the Resource Manager sends to a node to tell it to shut down only uses the Cmd field. For larger messages, Arg1 and Arg2 can represent, for example, a data pointer and a size, respectively.

The "Node Environment" field is not visible to the application, but is used for message routing: for messages to nodes, the Resource Manager uses this field to indicate to the Messenger which node the Message is destined for; for messages from nodes, this field tells the Resource Manager on the GPP which node sent the message.

The number of frames allocated for the Free MSG Pool is a design choice: allocating too many frames is wasteful, but not allocating enough means that the Messenger (or individual nodes) will need to block, or detect failure and retry later. One approach is to use the node configuration information held for each node (e.g. in a configuration database) to specify the maximum number of simultaneous in-use messages required by the node. As the node is created on the DSP, the Dispatcher will allocate the indicated number of message frames, and place them on the Free MSG Pool queue. As the Dispatcher deletes a node's resources, it will retrieve the same number of frames from the pool, and free them. For a node that does no application specific messaging, only one frame is needed to support a command/response protocol (e.g. for the RM to send an exit command to the node, and thereafter for a response to go back to the RM).

In some embodiments, an additional RPC function allows the RM to tell the RM server to allocate (or free) message frames on the fly.

When the Messenger receives a message from the GPP for a specific node it gets a free message frame structure from the Free MSG Pool, copies the three elements from the GPP message (Cmd, Arg1, Arg2) into the message frame, and then puts the message frame into the destination node's queue, increments the message count, and (optionally) posts the node's semaphore to allow notification to the node that a message is ready. The node's retrieve function will retrieve the message frame from the queue, the three elements of the message will be copied from the frame into a message structure associated with the node's retrieve function, and the frame retrieved from the queue will be put back on the Free MSG Pool queue.

Similarly, when a node wants to send a message to the GPP, it will fill a message structure and then call its send function. The node's send function will get a free message frame from the Free MSG Pool, copy the three elements of the message to the frame, set the node environment field, place the frame into the Shared Queue to GPP, and then post the Messenger's SWI.

When the Messenger retrieves a frame from the shared queue it will copy the message elements into a message buffer to go back to the GPP, and place the frame from the shared queue back in the Free MSG Pool. If additional messages are in the shared queue the Messenger can retrieve them as well. When the buffer to go to the GPP is full, or when no more messages are in the shared queue, the Messenger places the message buffer into the 'FromDSP' path to the GPP.

Figure 10:
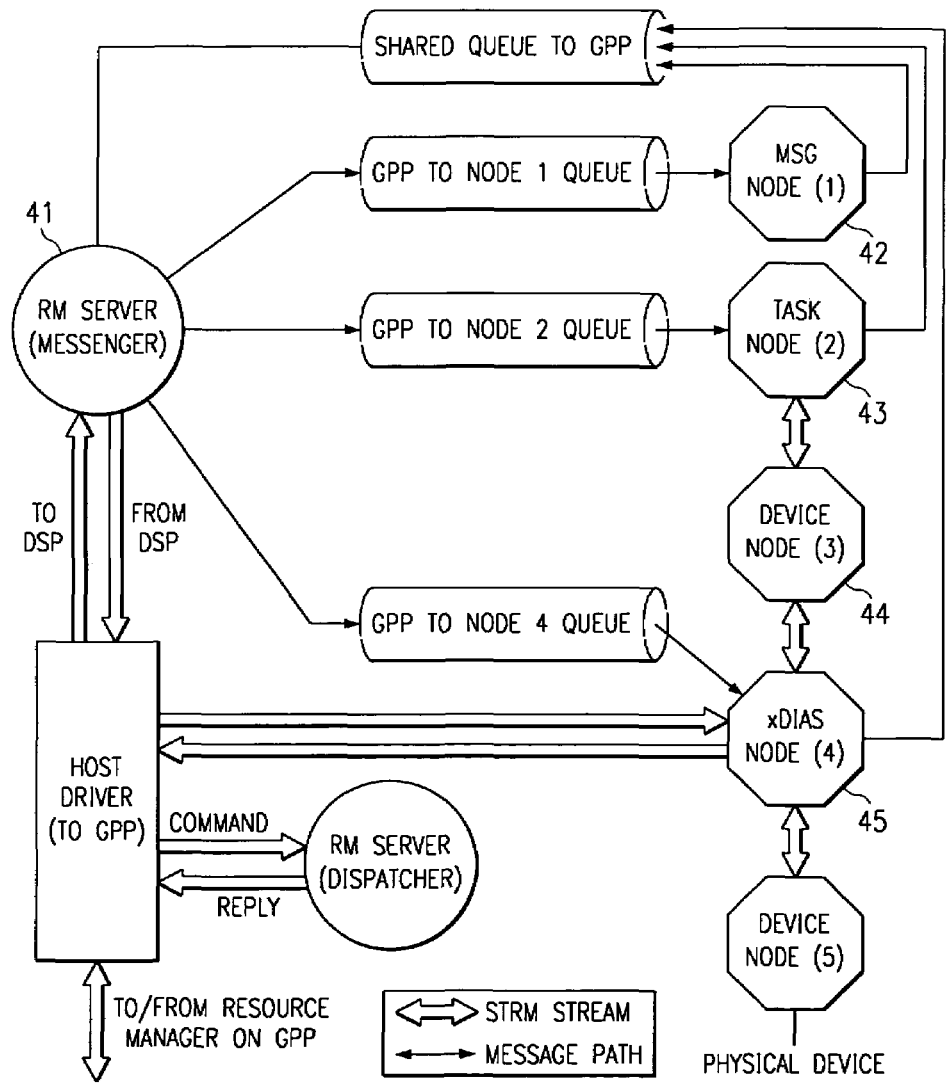

FIG. 10 illustrates all communication paths between the Resource Manager, the RM Server, and individual nodes, for a sample application. STRM streams are used to communicate between the Resource Manager and the RM Server Dispatcher; and can also be used by applications to communicate between nodes, and between nodes and the GPP. As indicated diagrammatically in FIG. 10, and as described herein, streams typically carry large blocks of data between tasks or processors, whereas message paths typically carry smaller amounts of data, for example, fixed-length control or status messages.

A 'Command' stream transports commands from the Resource Manager to the Dispatcher; and a 'Reply' stream transports Dispatcher responses back to the Resource Manager. The data formats of these transactions are described below. In some embodiments, for each command to the Dispatcher there will be a reply back to the Resource Manager.

A 'ToDSP' path transports messages from the Resource Manager to the Messenger; and a 'FromDSP' path transports messages back to the Resource Manager. Multiple node messages can be batched together in each buffer that traverses the 'ToDSP' and 'FromDSP' paths. Individual node messages are fixed length, but applications can overload these messages to serve as descriptors for blocks of larger data. In some embodiments, the command and reply streams can be secure, so that a user cannot easily corrupt this data.

When the RM Server Dispatcher creates a Message, Task, or xDAIS socket node, it also creates a dedicated queue to pass messages to the node. The message queue can be used to transport control messages from the Resource Manager directly to the node, and also to transport application-specific data to the node from user applications running on the GPP.

The techniques of the invention are applicable to many GPP and DSP combinations. For example, possible GPPs include: ARM7, ARM9, MIPS, Motorola DragonBall, and Intel x86; and possible DSPs include: TMS320C54x, TMS320C55x, TMS320C6x, and TMS320C3x (from Texas Instruments Incorporated). The GPPs and DSPs can have different native word sizes, and a GPP might be simultaneously controlling DSPs of different native word sizes running different RTOSs. To simplify the GPP and DSP interface code, target-independent message formats can be used. A 32-bit word size can be chosen, for example, as the standard messaging interchange unit. Processors with smaller word sizes can adapt to the larger word sizes.

For example, the TMS320 C54x has a 16-bit native word size. Older members of the C54x family are limited to 16-bit program addresses (and have 16-bit function pointers), but newer C54x processors also support 24-bit extended addressing of program space (requiring larger pointers and structure alignment). Without a standard interchange size, the GPP would need to know what mode the C54x is operating in (e.g., through a configuration database), in order to format pointers and structures appropriately. This adaptation requires extra code and complexity. To simplify the interface, a default 32-bit word size can be chosen for messaging between the Resource Manager and the RM Server.

An exception to the above rule is string passing. Strings sent by the Resource Manager to the RM Server (e.g., STRM device names), can be packed to the native DSP character size, and NULL terminated. For example, a 32-bit word will hold 2 characters for a C54x, and 4 characters for a C6x. The native character size will be constant within a given DSP family—it won't vary like addressing modes will. Allowing character packing will significantly reduce command structure sizes, and will be efficient for the DSP to interpret at runtime. The Resource Manager can determine the DSP character size from a configuration database, or via the RMS_queryServer function. The size of data elements when streaming data between the GPP and DSP will depend on the DSP's capabilities. The GPP might look in a configuration database, or use RMS_queryServer to determine this.

An example of the Resource Manager-to-Dispatcher RPC command packet format is shown in FIG. 11. The data[] array size will vary depending on the server function being invoked. For example, for a function like RMS_deleteNode that has no attached data, the size will be zero; but for a command like RMS_createNode that has an attached node arguments structure, this size might be several hundred words. The command packet frame size for the STRM stream between the Resource Manager and the Dispatcher should be large enough to accommodate the data requirements of all server functions.

Each server function can have two arguments (arg1 and arg2), and the Dispatcher RPC mechanism can attach a third argument to pass a pointer to the function-specific data array. For example, for a command packet containing (fxn, arg1, arg2, data0, data1, . . . ), the RM Server will invoke the function as:

(*fxn) (arg1, arg2, &data0)

An example of the Dispatcher-to-Resource Manager reply packet format is shown in FIG. 12. The result field is used to pass the return code from either a node function, or an RM Server function, back to the Resource Manager. For example, when RMS_deleteNode is invoked, the result field will contain the node's delete function return value (e.g., RMS_EOK, or RMS_EMEMFREE, etc.). For non-node RPC commands like RMS_queryServer, the result field is the return code of the server function. The arg1 field is used to pass a command-specific argument back to the Resource Manager. Initially, arg1 will only be used by RMS_createNode, to pass a pointer to the node's environment back to the Resource Manager. The arg2 field is an additional command-specific argument for use as desired.

FIG. 13 summarizes the usage of the FIG. 12 reply fields for each of the RPC functions of FIG. 3. In FIG. 13, a dash means that the reply field is available for desired use. The reply to RMS_executeNode depends on the node type. For message nodes, the result field contains the code returned by the node's execute function. For task and xDAIS nodes, the result field can be a simple acknowledgement that the command was received.

Exemplary return codes from the RM Server to the Resource Manager are enumerated in FIG. 14.

Referring again to FIG. 3, the RM Server RPC functions that can be invoked by a command from the Resource Manager are described below.

The RMS_queryServer function will allow the Resource Manger to query the RM Server for settings and capabilities. Examples of queries: the type of data processor (e.g. TMS320C5402, TMS320C5510, ARM7, etc.) the server is running on, the native character size, the underlying RTOS type, the server version (e.g., if the RM Server resides in ROM on the DSP and is not loaded by the GPP), the size of individual stream elements, etc.

The RMS_configureServer function will allow the Resource Manager to set configuration properties for the RM Server. An example would be setting a server mode that activates a different communication protocol to the Resource Manager.

The RMS_createNode function is invoked by the Resource Manager to create a new node on the DSP. The arguments include a pointer to a data structure that defines the node's configuration parameters, and also a pointer to the node's create-phase function. Some exemplary duties of RMS_createNode are: create a node environment structure; for Task nodes create the node's thread in an "inactive" state; fix-up the STRM definition offset arrays, turning them into pointer arrays; call the node's create-phase function; and respond to the RM with the returned status code, and the address of the node's environment structure. The above-described features and operations associated with the RMS_createNode function, and their invocation by RPC to the Dispatcher, are prior art with respect to the present invention.

According to the invention, RMS_createNode also performs the following exemplary duties: create a message queue to hold GPP messages to the node; allocate the specified number of message frames for Free MSG Pool, and place them in the pool.

The RMS_executeNode function is used by the Resource Manager to launch a node into its execute phase. The arguments include a pointer to the node's environment structure (initialized in the node's create phase), and a pointer to the node's execute-phase function. One duty of RMS_executeNode is, for Task nodes, change the node's priority level from inactive to its runtime priority. The above-described features and operations associated with the RMS_executeNode function, and their invocation by RPC to the Dispatcher, are prior art with respect to the invention.

According to the invention, RMS_executeNode also includes as an argument a pointer to a location that indicates the node type, and performs the following exemplary duties: reply to the Resource Manager to acknowledge execute commands; and for Message nodes, call the node's execute-phase function, and reply to the Resource Manager with the execute-phase function's return code.

The RMS_deleteNode function is invoked by the Resource Manager to delete a node's resources. The arguments include a pointer to the node's environment structure, and a pointer to the node's delete-phase function. Some exemplary duties of RMS_deleteNode are call the node's delete-phase function; for Task nodes, remove the node's task from the RTOS; reply to the Resource Manager that the node has been deleted; and free the node's environment structure. The above-described features and operations associated with the RMS_deleteNode function, and their invocation by RPC to the Dispatcher, are prior art with respect to the invention.

According to the invention, the RMS_deleteNode function also includes as an argument a pointer to a location that indicates the node type, and performs the following exemplary duties: remove any message frames remaining in the node's message queue and place them in the Free MSG Pool; get the number of message frames created for the node out of the message frame pool, and free them; and delete the node's message queue.

The RMS_changeNodePriority server function is used to change the runtime priority of a node (that is, change the runtime priority of a node that is already running), to suspend, resume, or simply reprioritize it. The arguments include a pointer to the environment of the node whose priority is to be changed, and the new priority level. This function can also be used to change the runtime priority of the Dispatcher itself.

The RMS_readMemory utility function allows the Resource Manager to read from DSP memory space. This can be useful, for example, when reading data from a DSP that is indirectly connected to the GPP via a network of DSPs and drivers.

The RMS_writeMemory utility function allows the Resource Manager to write a block of values (e.g., a program or data) to DSP memory space (e.g., to dynamically load code to a processor that is connected to the GPP via a network of DSPs and drivers). Note that the actual data to be written resides in a data array passed from the GPP; a size field in the array tells the DSP how many data words are in the array to be copied. An example of an RPC command packet format (see also FIG. 11) for the RMS_writeMemory function is shown in FIG. 15. In the FIG. 15 example, the destination memory space identifies, for example, a memory space that is internal or external relative to the DSP.

The memory write capability provided by the RMS_writeMemory function permits extensions and modifications to server capabilities at runtime. New server functions can be dynamically downloaded at runtime and executed via the RPC mechanism. These server functions can be entirely new functions, for example additional resource and power management, or can be replacements to the functions currently residing in the DSP base image. Thus, server functions need not reside permanently in DSP memory, but rather can be downloaded when needed and, when no longer needed, the memory space can be reclaimed for other use (e.g., by downloading another server function to the same memory space). As examples, any of the functions RMS_queryServer, RMS_configureServer, RMS_changeNodePriority and RMS_readMemory can be downloaded to DSP memory by invoking RMS_writeMemory. The downloaded function can then be invoked by its corresponding RPC command.

In some exemplary embodiments, the RMS_writeMemory function can reside in the DSP base image. When the RMS_writeMemory function is invoked, a new or replacement function is downloaded into DSP memory at the location designated at arg1 and arg2 in FIG. 15. Thereafter, when it is desired to invoke the new/replacement function, the address of the new/replacement function (already known from arg1 and arg2 in FIG. 15) is provided to the RM Server, together with any necessary arguments and data, in a suitable RPC packet. The function's address occupies the fxn field of the RPC packet (see also FIG. 11). The Dispatcher RPC mechanism will call the server function specified by the function address.

The above-described use of the RMS_writeMemory function to add new server functions is particularly advantageous because the new server functions can be added without modifying or otherwise affecting the functionality of the Dispatcher or already-existing server functions to which the new server functions are added. For example, and referring again to FIG. 3, if all of the server functions illustrated in FIG. 3 except RMS_queryServer are already existing functions on the co-processor side, then the server function RMS_queryServer can be added as a function on the co-processor side without modifying or otherwise functionally affecting the already existing server functions on the co-processor side, and without modifying or otherwise functionally affecting the Dispatcher (see also FIG. 2). Accordingly, no "regression" testing is needed when a new server function is added. Previously existing functions are not affected by the addition of the new function, so there is no concern about retesting the Dispatcher or the pre-existing server functions.

Another exemplary application of the RPC mechanism function is to change the runtime execution priorities of running nodes, thereby facilitating dynamic resource management by the GPP. In particular, using the RPC mechanism, the Resource Manager can dynamically "pause" a DSP node, for example to lighten the DSP processing load, and then later "resume" the DSP node. The Resource Manager can also use the RPC mechanism to change the mix of node runtime execution priorities, depending upon what is currently the most important duty for the DSP. The priority of the Dispatcher itself can also be changed at runtime by the Resource Manager. In some embodiments, the function RMS_changeNodePriority calls a further function in the RTOS, which further function changes node runtime priorities as indicated by the arguments and data of the RPC packet that invoked RMS_changeNodePriority. This further function can make the runtime priority changes by, for example, changing entries in a database which indicates the runtime priority of nodes/tasks running on the DSP. The database can be accessed by a scheduler in the RTOS in conventional fashion to set the priorities of the various nodes. Thus, by changing the priority entries in the database, the runtime execution priorities of the various nodes can be changed. Similarly, the aforementioned further function called by the RMS_changeNodePriority function can modify the database to indicate that a given node is to be "paused" or "resumed". These pause and resume operations can be viewed as further instances of changes in runtime priority.

Other exemplary functions that can be invoked using the RPC mechanism include a function for modifying the message passing operation of the DSP. For example, if the messaging link between the GPP and DSP is heavily loaded, an RPC packet can be sent to the RM Server directing it to batch GPP-bound messages together instead of sending them individually. This RPC packet would include fxn=RMS_configureServer, and at least one of arg1 and arg2 will tell RMS_configureServer to effect message batching operation. As another example, if the communication path between the GPP and the DSP is found to be lossy or unreliable, the communication format and/or protocol used for message passing can be dynamically changed by invoking RMS_configureServer with arg1 and/or arg2 defined appropriately to effect the desired change.

FIG. 16 illustrates exemplary embodiments of the invention wherein the physical data path 15 of FIG. 1 includes a data network, for example the Internet, thereby permitting the GPP to be located remotely from the DSP. Accordingly, the above-described exemplary operations which can be performed using the RPC mechanism of the present invention can be performed across long distances if the physical data path 15 includes a data network such as illustrated at 200, and suitable network interfaces 201 and 202.

In some embodiments, the GPP and DSP of FIG. 1 can be embedded together in a single integrated circuit chip which could also have embedded therein, for example, program memory and data memory to support operations of the GPP and the DSP. In other embodiments, a GPP such as shown in FIG. 1 can be embedded together in an integrated circuit along with a plurality of DSPs, and can be coupled to each of the DSPs for interacting therewith in generally the same fashion as described above with respect to FIGS. 1–15. In still further embodiments, a plurality of GPPs can be embedded together in a single integrated circuit along with a plurality of DSPs, each GPP coupled to and interacting with at least one DSP in generally the same manner described above with respect to FIGS. 1–15. In other embodiments, the GPP and DSP can be provided in respectively separate integrated circuits, and can also be located remotely from one another as shown in FIG. 16. In all embodiments described above, the GPP as host processor and the DPS(s) as co-processor(s) are only exemplary. In other embodiments, the host processor can be either a GPP or a DSP (or other special purpose processor), and the co-processor(s) can likewise be either a GPP or a DSP (or other special purpose processor).

FIG. 17 illustrates exemplary operations which can be performed by the present invention to download a new or replacement function to a data processor, for example the DSP of FIGS. 1 and 16. At 210, the download function is provided in the data processor's memory. At 211, the RPC function is used to invoke the download function, thereby downloading the new/replacement function. At 212, the RPC is used to invoke the new/replacement function.

Additional, internal RM Server functions are described below. The following internal RM Server functions are prior art with respect to the invention.

The RMS_rpc function is a simple function dispatcher. It is an infinite loop that reads Dispatcher RPC commands from the GPP, decodes them, calls the indicated server action, and then returns to the top of the loop to get the next command. It runs as a task of the RTOS, (i.e., it is the task execute function for the RM Server Dispatcher), and has no arguments or return value.

The RMS_runStub function is used to allow the RM Server to notify the Resource Manager that a specific task node has completed its execute phase. It is a small wrapper function that runs at the node's runtime priority. This stub is called by the RTOS when the node is activated, and it in turn calls the node's execute-phase function. When the execute function returns, the stub changes its own priority back to that of the RM Server Dispatcher, and then it sends a notification to the Resource Manager (on the shared queue to GPP) to signal that the execute phase is finished. It has no arguments or return value.

The RMS_replyToHost function is used to send a response back to the Resource Manager using the Dispatcher's Reply stream. Its arguments include a result code, and two command-specific arguments.

Although exemplary embodiments of the invention are described above in detail, this does not limit the scope of the invention, which can be practiced in a variety of embodiments.

What is claimed is:

1. A method of using a first data processor to manage resources of a second data processor which performs data processing functions that support user applications, comprising:
    the first data processor making a remote procedure call to the second data processor to invoke on the second data processor a program that supports management of data processing resources of the second data processor; and
    the second data processor executing the program in response to the remote procedure call, wherein said executing step includes the second data processor decoding the remote procedure call and calling the program, wherein the program permits the first data processor to set configuration parameters of the second data processor.

2. The method of claim 1, wherein said step of making a remote procedure call includes the first data processor providing a remote procedure call command to the second data processor.

3. The method of claim 1, wherein said executing step includes the program permitting the first data processor to write to a memory space associated with the second data processor, wherein the program permits the first data processor to set configuration parameters of the second data processor.

4. The method of claim 3, including the first data processor downloading a further program to said memory spate in conjunction with operation of the first-mentioned program.

5. The method of claim 1, wherein said executing step includes the program providing information indicative of a capability of the second data processor.

6. The method of claim 5, wherein said capability information includes information indicative of a native character size of the second data processor.

7. The method of claim 5, wherein said capability information includes information indicative of an operating system of the second data processor.

8. The method of claim 5, wherein said capability information includes information that identifies the second data processor.

9. The method of claim 1, wherein said executing step includes the program activating a desired communication protocol for communication between the first and second data processors.

10. The method of claim 1, wherein said executing step includes the program changing runtime priority associated with a data processing function of the second data processor.

11. The method of claim 10, wherein said changing step includes one of pausing and resuming said data processing function.

12. The method of claim 1, wherein said executing step includes the program permitting the first data processor to read from a memory space associated with the second data processor.

13. The method of claim 1, wherein said step of making a remote procedure call includes the first data processor providing to the second data processor a remote procedure call command which includes an address that points to a location of the program in a memory space of the second data processor.

14. The method of claim 1, including providing the program in a memory space of the second data processor.

15. The method of claim 14, wherein said providing step includes making a remote procedure call to the second data processor to invoke on the second data processor a farther program and, in response to the remote procedure call, the second data processor executing the further program to download the first-mentioned program into the memory space of the second data processor.

16. A data processing apparatus, comprising:
    a data processor for performing data processing functions that support user applications;
    a memory coupled to said data processor, said memory including a program that supports management of data processing resources of said data processor; and
    said data processor having an input for receiving from another data processing apparatus a remote procedure call, said data processor responsive to said remote procedure call for executing said program, wherein executing said program includes the data processor decoding the remote procedure call and calling the program, wherein the program permits said another data processing apparatus to set configuration parameters of the data processor.

17. The apparatus of claim 16, provided as a single integrated circuit chip.

18. The apparatus of claim 17, wherein said integrated circuit chip is one of a microprocessor chip and a digital signal processor chip.

19. The apparatus of claim 16, wherein said program permits said another data processing apparatus to write to a memory space associated with said data processor, wherein the program permits said another data processing apparatus to set configuration parameters of the data processor.

20. The apparatus of claim 16, wherein said program provides information indicative of a capability of the data processor.

21. The apparatus of claim 20, wherein said capability information includes information indicative of a native character size of the data processor.

22. The apparatus of claim 20, wherein said capability information includes information indicative of an operating system of said data processor.

23. The apparatus of claim 20, wherein said capability information includes information that identifies said data processor.

24. The apparatus of claim 16, wherein said program activates a desired communication protocol for communication between said data processing apparatus and said another data processing apparatus.

25. The apparatus of claim 16, wherein said program changes a runtime priority of one of said data processing functions on said data processor.

26. The apparatus of claim 16, wherein said program permits said another data processing apparatus to read from said memory.

27. A data processing system, comprising:
    a first data processor for performing a first data processing function;
    a second data processor for performing second data processing functions that support user applications;
    a communication path coupled to said first and second data processors for permitting communication therebetween;
    a memory associated with said second data processor, said memory including a program that supports management of data processing resources on said second data processor; and said first data processor operable for making a remote procedure call to said second data processor to invoke said program on said second data processor, said second data processor responsive to said remote procedure call for executing said program, wherein executing said program includes the second data processor decoding the remote procedure call and calling the program, wherein the program permits the first data processor to set configuration parameters of the second data processor.

28. The system of claim 27, provided as a single integrated circuit chip.

29. The system of claim 28, including a man/machine interface coupled to said first data processor for permitting communication between said first data processor and a user.

30. The system of claim 27, wherein said first data processor is one of a microprocessor and a digital signal processor, and said second data processor is one of a microprocessor and a digital signal processor.

31. The system of claim 27, including a man/machine interface coupled to said first data processor for permitting communication between said first data processor and a user.

32. The system of claim 31, wherein said man/machine interface includes one of a tactile interface and a visual interface.

33. The system of claim 27, wherein said communication path extends through a data network.

34. The system of claim 33, wherein said data network is the Internet.

35. The system of claim 27, wherein said first and second data processors are located remotely from one another.

36. The system of claim 35, including a man/machine interface coupled to said first data processor for permitting communication between said first data processor and a user.

37. The system of claim 27, wherein said program permits said first data processor to read from a memory space associated with said second data processor.

38. The system of claim 27, wherein said program provides information indicative of a capability of the second data processor.

39. The system of claim 38, wherein said capability information includes information indicative of a native character size of the second data processor.

40. The system of claim 38, wherein said capability information includes information that identifies said second data processor.

41. The system of claim 38, wherein said capability information includes information indicative of an operating system of said second data processor.

42. The system of claim 27, wherein said program activates a desired communication protocol for communication between said first and second data processors.

43. The system of claim 27, wherein said program changes a runtime priority of one of said second data processing functions on said second data processor.

44. The system of claim 27, wherein said program permits said first data processor to write to a memory space associated with said second data processor, wherein the program permits the first data processor to set configuration parameters of the second data processor.

45. The system of claim 44, wherein said first data processor is cooperable with said program for downloading a further program to said memory space.

* * * * *